United States Patent
Stanislaw

[11] Patent Number: 5,917,064
[45] Date of Patent: Jun. 29, 1999

[54] FILTER WITH HEATED TUBE SHEET

[75] Inventor: David Stanislaw, Cicero, Ill.

[73] Assignee: Industrial Filter & Pump Mfg. Co., Cicero, Ill.

[21] Appl. No.: 08/581,920

[22] Filed: Jan. 2, 1996

[51] Int. Cl.⁶ .................................................. B01D 53/26
[52] U.S. Cl. .............................. 55/341.11; 55/523; 55/484
[58] Field of Search .............................. 55/267, 523, 269, 55/302, 338, 339, 341.1, 484; 95/288

[56] References Cited

U.S. PATENT DOCUMENTS 3,837,151  9/1974  Jensen ........................................ 55/341
3,898,062  8/1975  Slakey ........................................ 55/269

Primary Examiner—Jay H. Woo
Assistant Examiner—Robert Hopkins
Attorney, Agent, or Firm—Patnaude, Videbeck & Marsh

[57] ABSTRACT

A tube type hot gas filter having a ceramic tube sheet supporting a plurality of tubular filter elements in a filter chamber includes an annular heating chamber surrounding the edge of said tube sheet and through which hot gas from the downstream side of the tube sheet passes as it exits the filter.

7 Claims, 2 Drawing Sheets

FILTER WITH HEATED TUBE SHEET

The present invention relates in general to filters of the type commonly used in the filtration of hot gasses wherein a plurality of tubular perforate filter elements are suspended in a filter chamber from a tube sheet which extends across the top of the filter chamber, and it relates more particularly to a new and improved filter of this type wherein the temperature gradient from the center to the periphery of the tube sheet is maintained relatively constant.

BACKGROUND OF THE INVENTION

When the temperatures of the gas being filtered are extremely high, say above 1400 degrees F., it has been the practise to manufacture the internal parts of the filter from ceramic materials. Temperature gradients in ceramic materials are known to cause cracking, and in the case of large diameter tube sheets where the peripheral portions are in proximity to the ambient while the central portions are exposed only to the hot gasses being filtered, avoidance of cracking due to the tendency of the peripheral portions of the tube sheets to be cooler than the central portions has become a major objective in the design of hot gas filters.

SUMMARY OF THE INVENTION

Briefly, there is provided in accordance with the present invention a tube or candle type filter wherein a portion of the hot gas being filtered is routed past the peripheral portions of the tube sheet to maintain the temperature of the peripheral portions of the tube sheet at the same temperature as the central portion, thereby to minimize any temperature gradients within the tube sheet.

In a preferred embodiment of the invention, a portion of the clean filtered gas is fed through a plurality of symmetrically spaced passageways to an annular heating chamber which surrounds the periphery of the tube sheet and from which the gas flows to the ambient or other location at which the pressure is lower than that in the filter. Preferably, the gas which is used to provide auxiliary heating of the peripheral portions of the tube sheet is returned to the main stream.

GENERAL DESCRIPTION OF THE DRAWINGS

The above and further attributes of the present invention will become apparent from a reading of the following detailed description of the invention taken in connection with the accompanying drawing wherein.

DETAILED DESCRIPTION OF THE DRAWINGS

Figure 1:
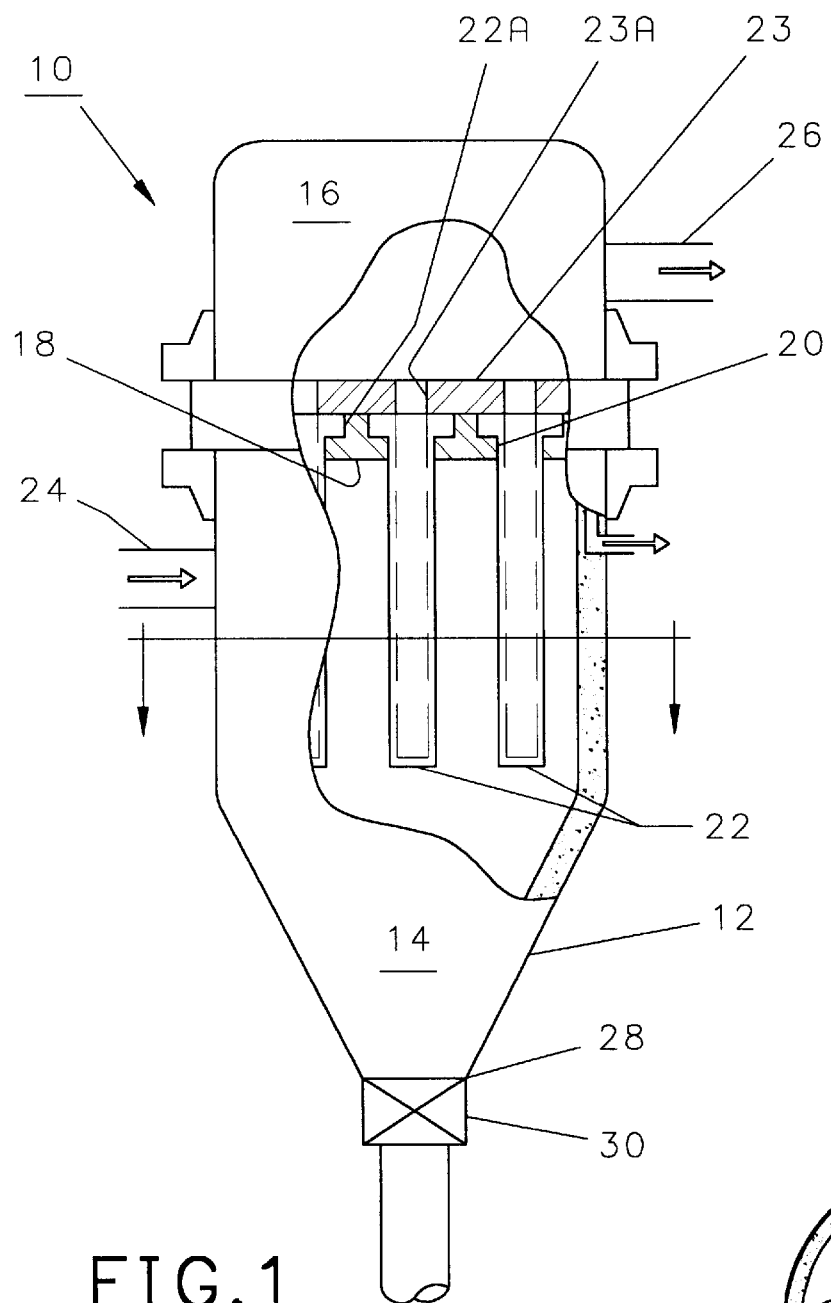
FIG. 1 is a generally schematic, elevational view of a filter suitable for use with the present invention.
Figure 2:
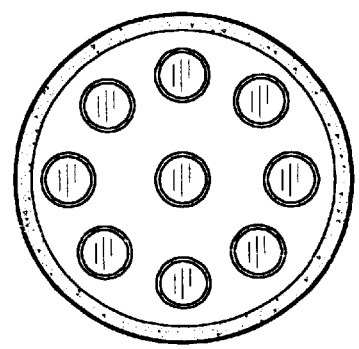
FIG. 2 is a sectional view of FIG. 2 taken along the line 2—2 thereof.

Referring to the drawings and particularly to FIGS. 1 and 2 thereof, there is shown in schematic form a filter 10 of the type used in the filtration of hot gasses such as those exiting furnaces and the like. This filter incorporates as its principal elements a sealed tank 12 having a filter chamber 14 located below an outlet chamber 16. A tube sheet 18 extends across the tank 12 and sealably separates the filter chamber 12 from the outlet chamber 16. The tube sheet 18 is made of a high temperature ceramic and includes a plurality of circular openings 20 through which a plurality of tubular filter elements 22 depend into the filter chamber 14. In a typical filter of this type used in the filtration of hot gas there will be many more filter elements, say two hundred or more, but for purposes of explanation of the invention the filter 10 is shown to have only nine such filter elements. However, the operation is the same regardless of the number of filter elements employed in a single filter. Each of the filter elements 22 is closed at the bottom and has an external flange 22A at the top which rests in a counterbore in the tube sheet 18 at the top of the associated hole 20 through which the filter element extends. A cover sheet 23, also constructed of a high temperature ceramic, is seated on top of the tube sheet 18 and has a plurality of circular openings 23A which are aligned with the openings 20 in the tube sheet 18.

The dirty gas to be filtered is supplied to the filter chamber 14 through an inlet port 24 in the tank 12 and after passing through the filter elements 22 exits the filter 10 from the outlet chamber through a clean gas outlet port 26. As the gas passes through the filter elements, particulate material entrained in the gas collects on the exterior surfaces of the filter elements and must be removed periodically in accord with any one of the many cleaning procedures well known in the prior art. The manner in which the filter elements are cleaned does not form a part of the present invention, but the dust which is removed from the filter elements 22 falls to the bottom of the filter tank from which it is removed through a dust outlet port 28 at the bottom of the tank. A valve 30 is used to selectively open the port 28 to permit the dust to fall therethrough.

It has been found that there is a tendency for the tube sheets to crack during use of these types of filters and it is believed that such cracking is due to the thermal stresses which are placed on the tube sheets by the large temperature gradients which occur between the central and peripheral portions of the tube sheets. In a typical filter the distance between the center and the periphery of the tube sheet is several feet and the periphery of the tube sheet is in proximity to the temperature of the ambient, about room temperature, while the central portion is exposed only to the temperature of the hot gas being filtered, typically from about 1400 degrees F. to 1800 degrees F. or higher.

In accordance with the present invention, a small portion, say about one percent, of the hot gas being filtered is routed in proximity to the peripheral portions of the tube sheet 18 and the hold-down sheet 23. In the preferred embodiment illustrated and described herein the clean gas which has passed through the filter elements is used for heating the peripheral portions of the tube sheet 18 and the hold-down sheet 23 so that frequent cleaning of the small passageways carrying such gas is not required, but the dirty gas could be used for this purpose if desired.

Figure 3:
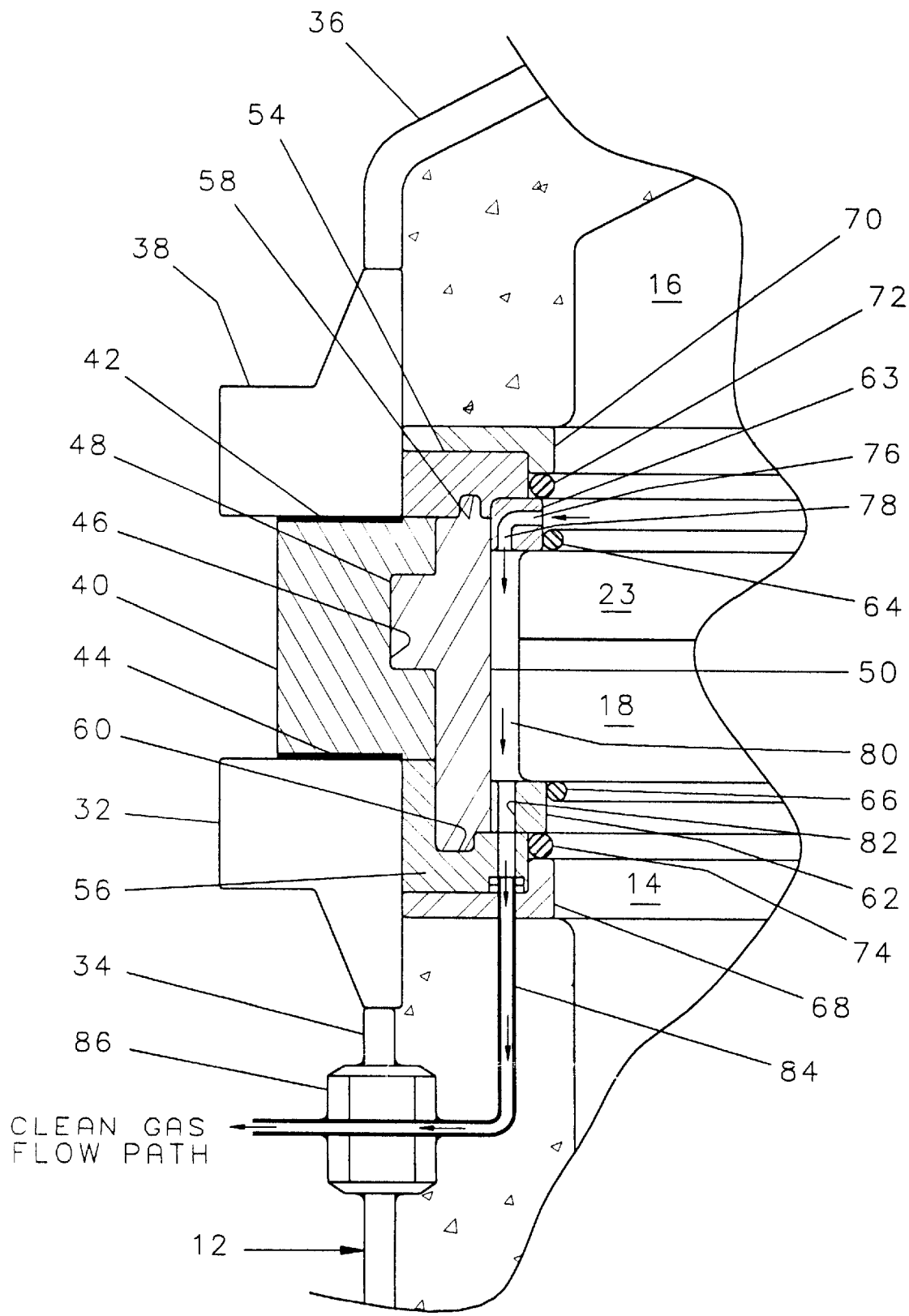
FIG. 3 is an enlarged, cross-sectioned, elevational view of a portion of a filter of the general type shown in FIGS. 1 and 2 particularly showing the way in which the hot gas being filtered is used to heat the peripheral portions of the tube sheet in accordance with the present invention.

Referring to FIG. 3 wherein a portion of the filter 10 is shown in detail to facilitate a better understanding of the invention, it will be seen that the tank 12 includes an annular flange 32 welded to the top of a cylindrical wall secttion 34. The top of the tank 12 consists of a removable cover 36 which also includes an annual flange 38. A clean gas outlet 26 (not shown in FIG. 3) extends through the cover 36, and a dirty gas inlet 24 (not shown in FIG. 3) extends through the cylindrical wall of the tank 12. Both the upper and lower portions of the tank 12 are lined with a suitable refractory material to reduce the temperature of the metal parts of the tank which cannot withstand the temperatures of the gas being filtered.

Mounted across the tank just below the cover part 36 is a tube sheet assembly including the tube sheet 18 and the hold-down sheet 23. Additionally, the tube sheet assembly includes an annular steel ring member 40 which is positioned between the flanges 32 and 38 and sealed thereto by a pair of sealing gaskets 42 and 44 which are compressed between the ring 40 and the flanges. An annular groove 46 in the internal surface of the ring member 40 receives an external annular flange 48 on a ceramic spacer ring 50 which is held in place between a plurality of spaced steel clamp members 54 and 56 which have internal grooves 58 and 60 which respectively receive complementary external flanges on the spacer 50. The clamp members are respectively bolted to the flange members 32 and 38. A ceramic ring 62 is positioned under the peripheral portion of the tube sheet 18 and a similar ceramic ring 63 is positioned over the peripheral portion of the hold-down sheet 23 and these rings are sealed to the rings thereto by a pair of annular gaskets 64 and 66. The two rings 62 and 63 are respectively sealed to a pair of ceramic spacer rings 68 and 70 by a pair of annular sealing gaskets 72 and 74.

In order to route a portion of the hot clean gas around the peripheries of the tube sheet and the hold-down sheet, a plurality of horizontal orifices 76 which open onto respective vertical orifices 78 are provided in the upper part of the ring 62. While the number of such passageways is not critical, in a commercial embodiment of the invention such passageways are provided at locations ten degrees apart. These orifices open onto an annular heating chamber 80 disposed between the peripheries of the sheets 18 and 23. A plurality of vertical outlet passageways 82 extends through the bottom of ring 62 and connect with outlet tubes 84 which extend through the a suitable mount 86 in the wall of the lower portion of the tank 12. In the said commercial embodiment of the invention six such passageways are provided.

In operation, hot gas enters the tank through the inlet port and flows from the filter chamber through the tubular filter elements to the outlet chamber at the top of the filter from which the major portion exits the filter 10 through the clean gas outlet port 26. A small portion of the clean hot gas is bled off the main stream and flows through the annular chamber 80 at the peripheries of the sheets 18 and 23. The chamber 80 is thus maintained at about the same temperature as that at the center of the sheets 18 and 23 so that no appreciable temperature gradient occurs between the centers and the peripheries of the tube and hold-down sheets. Consequently, the problem of tube sheet cracking is alleviated.

The amount of gas which must be routed around the periphery of the tube and hold down sheets to prevent cracking of the sheets will vary with the diameters of the temperatures involved, and the materials used. However, only a small portion, say about one percent, or less of the gas which flows through the filter need be used for auxiliary heating of the tube and hold-down sheets.

While the present invention has been described in connection with a particular embodiment thereof, it will be understood that those skilled in the art may make many changes and modifications therein without departing from the true spirit and scope of the invention, and therefore, it is intended in the appended claims to cover all such changes and modifications which come within the true spirit and scope of the invention.

What is claimed:

1. A ceramic filter including a ceramic tube sheet which extends across a filter tank and separates the tank into a filter chamber and an outlet chamber, said filter sheet supporting a plurality of ceramic filter elements which extend into said filter chamber and through which a hot gas passes while flowing from said filter chamber to said outlet chamber, comprising in combination inlet means through said tank for carrying hot gas to be filtered to said filter chamber, outlet means through which hot gas flows from said tank after passing through said filter elements and said outlet chamber, passageway means opening onto one of said chambers for carrying a portion of said hot gas therefrom, a portion of said passageway means being located in proximity to the peripheral portions of said tube sheet to cause said hot gas to contact said peripheral portions of said tube sheet for maintaining the temperature of said tube sheet substantially uniform between the central and peripheral portions thereof.

2. A filter according to claim 1 wherein said passageway means comprises means defining a heating chamber adjoining the periphery of said tube sheet.

3. A filter according to claim 2 wherein said heating chamber surrounds the periphery of said tube sheet.

4. A filter according to claim 1 wherein said one of said chambers is said outlet chamber.

5. A filter according to claim 4 wherein a heating chamber surrounds said tube sheet, and said passageway means includes a plurality of spaced passages extending between said outlet chamber and said heating chamber.

6. A filter according to claim 5 wherein said passageway means comprises a passageway for carrying hot gas from said heating chamber to the exterior of said tank thereby to provide a flow of hot gas through said heating chamber.

7. A filter according to claim 6 comprising a plurality of spaced passageways for carrying hot gas from said heating chamber to the exterior of said tank.

* * * * *